Sept. 12, 1961 T. R. KOHLER 2,999,937
X-RAY APPARATUS
Filed Oct. 20, 1958
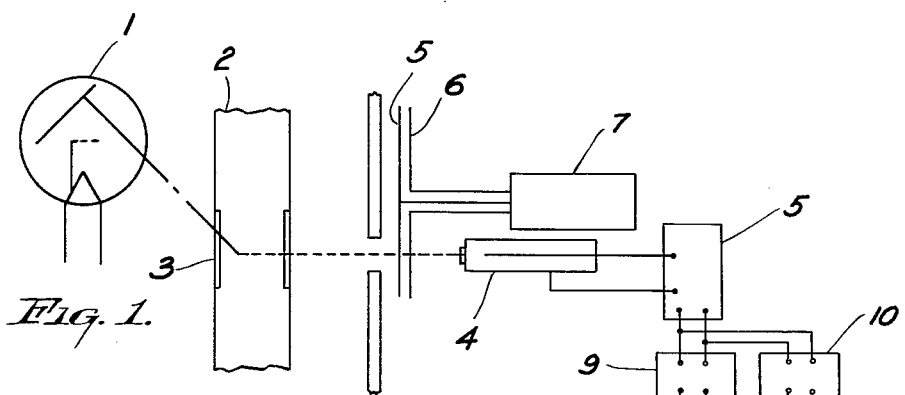
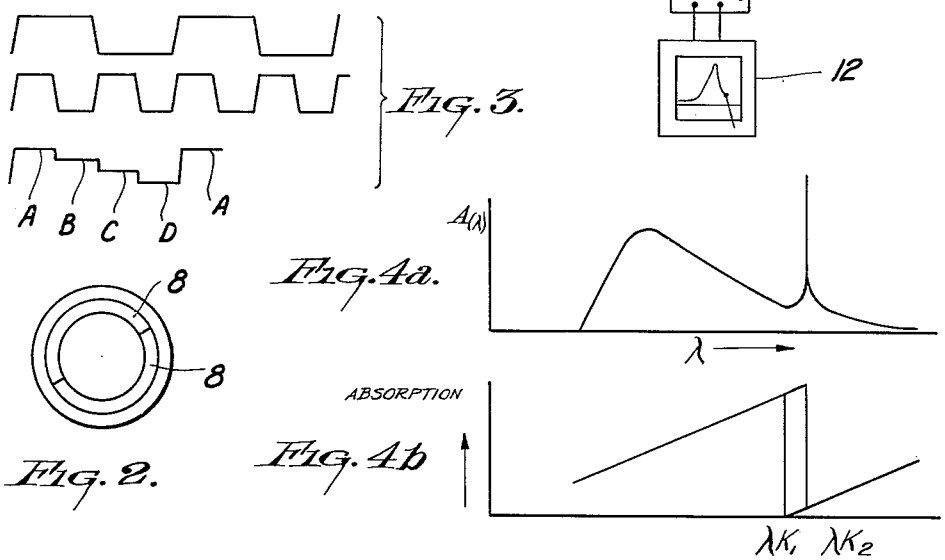
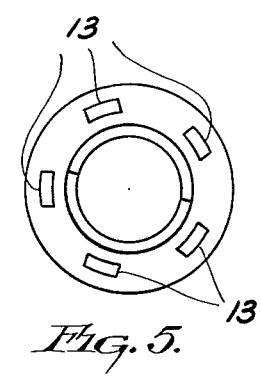
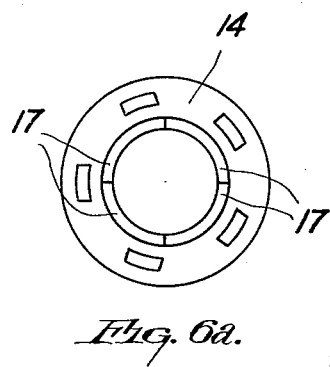
INVENTOR.
THOMAS R. KOHLER.
BY
AGENT.

United States Patent Office 2,999,937
Patented Sept. 12, 1961

2,999,937
X-RAY APPARATUS
Thomas R. Kohler, Ardsley, N.Y., assignor to North American Philips Company, Inc., New York, N.Y., a corporation of Delaware
Filed Oct. 20, 1958, Ser. No. 768,143
9 Claims. (Cl. 250—83.3)

My invention relates to apparatus for selectively measuring wave-lengths in a polychromatic beam of X-rays. More particularly, the invention is useful in the analysis of materials for the constituent elements thereof by X-rays and will be described in connection therewith.

X-rays have been widely used in the analysis of materials in order to determine their constitution because of the non-destructive nature of X-rays. For example, a sample of the material is exposed to X-rays in order to excite the elements in the specimen to generate their own characteristic X-rays which can be detected and thereby enable an identification of the elements composing the material. Since each element when suitably excited emits characteristic X-radiation having a given wave-length which is different from that generated by any other element, it is necessary to separate the wave-lengths corresponding to each element in the material in order to identify a particular element.

In one form of apparatus for this purpose there is provided between the sample and the detector a crystal which reflects the different wave-lengths at different angles in accordance with Bragg's law:

$$\lambda = 2d \sin \theta$$

where $\lambda$ is the wave-length, $d$ the spacing between the lattice planes of the crystal and $\theta$ the reflection angle. By fixing the angle of the detector relative to the specimen, a particular wave-length may be found, and if the detected radiation has a measurable intensity, the presence of the element corresponding to the wave-length is determined.

Another possibility is to measure the intensity of X-rays in a given wave-length interval by the interposition of suitable filters between the specimen and the detector. As is well-known in the art, two filters of appropriate materials and thickness may be chosen so that their X-ray transmissions are approximately matched except for the wave-length interval between the K-absorption edges. The difference between two measurements made with each filter separately in the beam is approximately a measure of the X-ray energy between the absorption edges of the two filters. Thus:

$$I = \int_{\lambda_{K_1}}^{\lambda_{K_2}} A(\lambda)[T_1(\lambda) - T_2(\lambda)]d\lambda$$

$$+ \int_0^{\lambda_{K_1}} A(\lambda)[T_1(\lambda) - T_2(\lambda)]d\lambda$$

$$+ \int_{\lambda_{K_2}}^{\lambda_{K_1}} a(\lambda)[T_1(\lambda) - T_2(\lambda)]d\lambda$$

(1)

where $A(\lambda)$ is the spectral distribution of the incident X-ray beam, $T_1$ is the transmission coefficient of the first filter and $T_2$ the second filter. Thus, if $T_1(\lambda) = T_2(\lambda)$ in all parts of the spectrum except between $\lambda_{K_1}$ and $\lambda_{K_2}$ the above-mentioned difference measures the X-ray intensity $\lambda_{K_1}$ and $\lambda_{K_2}$. Unfortunately, the above does not hold exactly and the error is thus proportional to $(T_1-T_2)$ in that part of the spectrum not lying between $\lambda_{K_1}$ and $\lambda_{K_2}$.

A further method has been proposed by Kirkpatrick and Chang, Physical Review 66, p. 159, in which by using two filters of each material and making appropriate measurements with combinations of these, one may measure:

$$I = \int_{\lambda_{K_1}}^{\lambda_{K_2}} A(\lambda)[T_1(\lambda) - T_2(\lambda)]^2 d\lambda$$

$$+ \int_0^{\lambda_{K_1}} A(\lambda)[T_1(\lambda) - T_2(\lambda)]^2 d\lambda$$

$$+ \int_{\lambda_{K_2}}^{\infty} A(\lambda)[T_1(\lambda) - T_2(\lambda)]^2 d\lambda$$

(2)

Since $T_1(\lambda)$ and $T_2(\lambda)$ are nearly equal and small with respect to one in the region of interest, it follows that:

$$[T_1(\lambda) - T_2(\lambda)]^2 \ll [T_1(\lambda) - T_2(\lambda)]$$

and hence the error in the measurement of the region between $\lambda_{K_1}$ and $\lambda_{K_2}$ is reduced.

The principal difficulty with the method proposed by Kirkpatrick and Chang, supra, is the requirement that four separate measurements are required. This means that two filters having the same transmission characteristics must be interposed between the specimen and the detector which in this case means first two filters having a transmission characteristics $T_1$ and then two filters having transmission characteristic $T_2$. This must then be followed with measurements using filters of different transmission characteristics in both orders. The obvious cumbersomeness of this technique has been a hindrance toward its adoption as an effective means of measuring the intensity in a given wave-length interval of a polychromatic beam of X-rays in order to obtain, in affect, a monochromatic X-ray beam.

It is a principal object of my invention to provide apparatus for measuring the intensity of only a small band of wave-lengths in a polychromatic beam of X-rays involving the use of filters.

It is a further object of my invention to provide apparatus for carrying out a method of measuring the intensity only of a small band of wave-lengths in a beam of polychromatic X-rays involving the use of two pairs of like filters used jointly and in different combinations.

A still further object of my invention is to provide apparatus for rapidly and efficiently determining the constituent elements of a sample of material.

Another object of my invention is to provide apparatus for controlling the composition of a material during its preparation.

These and further objects of my invention will appear as the specification progresses.

Briefly, my invention provides a simple and novel apparatus for instrumenting the method proposed by Kirkpatrick and Chang supra. In that method, two similar filters of element A and two of element B are used. From an X-ray source adjacent beams, defined by similar diaphragms, are allowed to pass to a common ion chamber or detector. An ion current observation is made with the superposed A filters in one beam and the superposed B filters in the other. One A and one B filter are transposed and a second current is taken. The difference between these currents is then a summation to which each wave-length contributes an amount proportional to $(a-b)^2$ as defined in Eq. 2.

In accordance with my invention, the filter elements are mounted on one or more discs in such relationship that as the disc or discs are rotated two like filters, and then two dissimilar filters are interposed between the X-ray source and the detector. Preferably, I use a detector which produces an electrical signal having components, which after suitable amplification, may be separated by phase-sensitive detectors, referenced to the rotation of the filters, into two components. By subtracting these signals, a signal proportional to Equation 2 is obtained from which the identity and quantity of a component of the specimen can be determined.

The invention will be described with reference to the accompanying drawing, in which:

FIG. 1 is a schematic view of an embodiment of the invention;

FIG. 2 is one form of filter arrangement according to the invention;

FIG. 3 is a graphic showing of the type of signal generated by the apparatus of FIG. 1;

FIGS. 4a and b are graphic showings of the output of the device shown in FIG 1;

FIG. 5 is another embodiment of the filter arrangement adapted for use in the apparatus shown in FIG. 1; and FIG. 6a is a plan view of still another embodiment of the filter arrangement adapted for use in the apparatus shown in FIG. 1;

FIG. 6b is a side view of the embodiment shown in FIG. 6a.

An important application of the use of X-rays for determining the constitution of a material is the continuous control of a process involving materials whose composition must meet specified standards. This may involve the beneficiation of ores or the blending of constituents to form new products. Accordingly, while my invention is not limited to this particular application, FIG. 1 shows such an application of the invention.

X-rays generated at the target of a conventional X-ray tube 1 enter a chamber 2, through a window 3, in which a material, which may be a solid, liquid, or gas, can flow. If the wave-length of the primary X-rays generated by the X-ray tube is shorter than the absorption edge of any element in the material in chamber 2, secondary characteristic X-rays will be generated by such elements.

For example, the concentration of copper in brass can be determined by introducing the sample into the chamber and generating primary X-rays having a wave-length shorter than the K-absorption edge of copper (K-absorption edge 1.3780 A.). The copper will generate it own characteristic secondary X-rays. Simultaneously, if any other elements are present, they too will generate secondary charactertistic X-rays. It is, therefore, essential to separate the secondary X-rays generated from the copper from those generated by other elements.

In accordance with my invention, I interposed between a detector 4, which may be any detector of the ionization type which can produce electrical pulses in response to ionizing radiation such as a Geiger-Müller counter, proportional counter, scintillation counter, or the like, a filter device comprising two filter discs 5 and 6, respectively. Each filter disc comprises a pair of filter elements 8 as shown in FIG. 2 which will have absorption characteristics as shown in FIG. 4b, i.e., will absorb wave-lengths shorter than its absorption edge. For the case described, one of these filter elements may appropriately be cobalt and the other nickel. One of the discs 6 is coupled, like disc 5, to a motor 7 and is driven at twice the speed of disc 5.

The pattern of radiation transmitted by disc 5, as it rotates, will correspond to the upper step-wise function in FIG. 3 while that of filter disc 6, in the absence of disc 5, would correspond to the second or intermediate step-wise function shown in FIG. 3. The composite output following both filter discs corresponds to the lowest step-wise function in FIG. 3.

Since the detector converts the radiation into an electrical signal corresponding to the lower step-wise function in FIG. 3, the signal may be separated by phase-sensitive detectors, referenced to the rotation of the filters, into two component A—C and B—D. Consequently, the output of detector 4, is coupled through an amplifier 5 to two phase-sensitive detectors 9 and 10 which splits the composite signal into the aforesaid components.

By subtracting the latter from the former of the two signals derived from the phase-sensitive detectors in an electrical subtractor 11, a difference signal $$A+D-(B+C)$$

is obtained which is a signal proportional to Equation 2. Consequently, by proper choice of filter elements, the passband, that is, the band of wave-lengths which is effective in producing the output signal, can be made narrow enough to exclude nearly all but the wave-length of the secondary X-rays generated by a single element, namely, in the instant case, copper. The output of the subtractor is conveniently connected to a strip chart recorder 12 for recording and measuring the intensity of this signal.

FIG. 4b shows the absorption characteristics of the two filters. If this is the same for all wave-lengths outside the interval between $\lambda_{K_1}$ and $\lambda_{K_2}$, the above-mentioned measurement will correspond to the intensity of the X-rays in this interval and would encompass the peak shown in FIG. 4a.

The output of the system is, therefore, effectively that due to a beam of monochromatic beam of X-rays of high intensity. FIG. 4a shows a beam of polychromatic X-rays incident on the detection system, which includes the filters.

In order to stabilize the system against changes in the source and the detector, it is possible to provide another aperture looking at the source and chopped by one of the sectors having a series of holes 13 (FIG. 5), the number of which is not divisible by 2. This will furnish a signal which is a non-integral number of times the signal frequency. This may be separated electrically from the signal frequency and used to form a ratio with the above described signal and thus to give an output independent of the source and detector.

In another embodiment of the invention, the two discs can be replaced by a single disc 14 of the construction shown in FIG. 6. The central portion of the disc is provided with four sectors 17 each comprising two filters. One sector comprises two layers of nickel, the second, one layer of nickel and one of cobalt; the third, two cobalt layers; and the fourth cobalt and nickel, in that order. Filters of the same material should be of the same thickness.

In a still further embodiment of the invention which, for simplicity, is not illustrated, the filters could be rotated slowly in order that digital counting techniques could be applied to the signal. In this case, the reference signal could not be counted simultaneously but an additional interval would be needed.

It is obvious that while the invention has been descirbed in connection with specific embodiments and a specific application thereof, other applications and embodiments will be recognized by those skilled in the art. I, therefore, do not wish to be limited to the specific devices and applications herein disclosed but desire to have the inventions as defined in the appended claims, construed as broadly as possible.

What I claim is:

1. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wavelengths may be measured including that of a wave-length corresponding to a given wave-length in said polychromatic beam of X-rays, said filter means comprising two pairs of filter elements, each pair of said filter elements being mounted in a rotatable disc member one pair of filter elements each having an absorption edge which is shorter than said given wave-length and the other pair of filter elements each having an absorption edge which is longer than said given wave-length, and means to rotate said disc member to alternately interpose between the specimen and detector two filter elements having the same absorption edge and two filter elements having different absorption edges.

2. Apparatus for selectively measuring wave-lengths in a polychromatic beam of X-rays comprising means to detect said polychromatic beam of X-rays and filter means disposed to intercept said polychromatic beam of X-rays before entering the detector in order that the intensity of a selected range of wave-lengths may be measured including that of a wave-length corresponding to a given wave-length in said polychromatic beam of X-rays, said filter means comprising first and second aligned disc members each having first and second filter elements, the first filter elements of each of said disc members having an absorption edge which is shorter than said given wave-length and the second filter elements of each of said disc members each having an absorption edge which is longer than said given wave-length, and means to rotate said disc members relative to one another to alternately interpose between the specimen and detector filter elements having the same absorption edge and filter elements having different absorption edges.

3. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wave-lengths may be measured including that of a wave-length corresponding to a given wave-length in said polychromatic beam of X-rays, said filter means comprising first and second filter discs each having first and second portions, the first portions of each of said filter discs having an absorption edge which is shorter than said given wave-length, the second portions of each of said filter elements having an absorption edge which is longer than said given wave-length, and means to rotate one of said discs at twice the speed of the other thereby alternately interposing between the specimen and detector portions of said filter elements having the same absorption edge and portions of said filter elements having different absorption edges.

4. Apparatus for selectively measuring wave-lengths in a polychromatic beam of X-rays comprising means to detect said polychromatic beam of X-rays and filter means positioned to intercept the polychromatic beam of X-rays before entering the detector in order that the intensity of a selected range of wave-lengths may be measured including that of a wave-length corresponding to a given wave-length in said polychromatic beam of X-rays, said filter means comprising a disc having one segment constituted of two filter elements having an absorption edge which is shorter than said given wave-length, a second segment constituted of two filter elements each having an absorption edge which is longer than said given wave-length, and third and fourth segments having two filter elements one of which has an absorption edge longer than and the other shorter than said given wave-length, and means to rotate said disc to thereby interpose between the specimen and detector two filter elements having the same K-absorption edge and two filter elements having different K-absorption edges.

5. Apparatus for selectively measuring wave-lengths in a polychromatic beam of X-rays, means to detect said polychromatic beam of X-rays and filter means disposed to intercept the polychromatic beam of X-rays before entering the detector in order that the intensity of a selected range of wave-lengths may be measured including that of a wave-length corresponding to a given wave-length in said polychromatic beam of X-rays, said filter means comprising two pairs of filter elements, each pair of said filter elements being mounted in a rotatable disc member one pair of filter elements each having an absorption edge which is shorter than said given wave-length and the other pair of filter elements each having an absorption edge which is longer than said given wavelength, means to rotate said disc member to alternately interpose between the specimen and detector two filter elements having the same absorption edge and two filter elements having different absorption edges, and means responsive to the output of the detector to measure the intensity of the X-rays in said selected range of wave-lengths.

6. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wave-lengths may be measured including that of a wave-length corresponding to a given wave-length in said polychromatic beam of X-rays, said filter means comprising two pairs of filter elements, each pair of filter elements being mounted in a rotatable disc member one pair of filter elements each having an absorption edge which is shorter than said given wave-length and the other pair of filter elements each having an absorption edge which is longer than said given wave-length, and means to rotate said disc member to alternately interpose between the specimen and detector two filter elements having the same absorption edge and two filter elements having different absorption edges, and means responsive to the output of the detector to measure the intensity of the X-rays in said selected range of wave-lengths including means to derive two signals, each of which is proportional to the difference in intensity of the X-rays passing through pairs of filter elements having like and different absorption edges, and means to obtain a signal proportional to the difference between said latter two signals.

7. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wave-lengths may be measured including that of a wave-length corresponding to a given wave-length in said polychromatic beam of X-rays, said filter means comprising two pairs of filter elements, one pair of filter elements each having an absorption edge which is shorter than said given wave-length and the other pair of filter elements each having an absorption edge which is longer than said given wave-length, and means to alternately interpose between the specimen and detector two filter elements having the same absorption edge and two filter elements having different absorption edges, means responsive to the output of the detector to measure the intensity of the X-rays in said selected range of wave-lengths, said latter means including means to derive two signals each of which is proportional to the difference in intensity of X-rays passing through filter elements having like and different absorption edges, means to obtain a signal proportional to the difference between said latter two signals and means to monitor said X-ray beam independently of the X-rays transmitted by said filter elements.

8. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wave-lengths may be measured including that of a wave-length corresponding to a given wave-length in said polychromatic beam of X-rays, said filter means comprising a disc including four pairs of filter elements, one pair comprising filter elements each having an absorption edge which is shorter than said given wave-length, a second pair comprising filter elements each having an absorption edge which is longer than said given wave-length, and third and fourth pairs comprising respectively one each of a filter element having an absorption edge longer than said given wave-length and one shorter than said given length, and means to rotate said disc and thereby alternately interposing between the specimen and detector two filter elements having the same absorption edge and two filter elements having different absorption edges.

9. Apparatus for selectively measuring wave-lengths in a polychromatic beam of X-rays comprising means to detect said polychromatic beam of X-rays, and filter means positioned to intercept said polychromatic beam of X-rays before entering the detector in order that the intensity of a selected range of wave-lengths may be measured including that of a wave-length corresponding to a given wave-length in said polychromatic beam of X-rays, said filter means comprising a disc including four pairs of filter elements, one pair of comprising two filter elements each having an absorption edge which is shorter than said given wave-length, a second pair comprising two filter elements each having an absorption edge which is longer than said given wave-length, and third and fourth pairs comprising respectively one each a filter element having an absorption edge longer than said given wave-length and one shorter than said given wave-length, means to rotate said disc thereby alternately interposing between the specimen and detector two filter elements having the same absorption edge and two filter elements having different absorption edges, and means to monitor the X-ray beam independently of said filter element including a plurality of apertures in said disc, not divisible by two, through which said beam passes and is detected.

References Cited in the file of this patent

UNITED STATES PATENTS

| | | |
|---|---|---|
| 2,534,657 | Bray | Dec. 19, 1950 |
| 2,764,692 | Miller | Sept. 25, 1956 |
| 2,784,319 | Flook et al. | Mar. 5, 1957 |

OTHER REFERENCES

Kirkpatrick et al.: "X-ray Monochromatization by Four Balanced Filters," article in Physical Review, 2nd, vol. 66, page 159; July 22, 1944.

Cullity: Elements of X-ray Diffraction; pp. 211–212, September 7, 1956.